Figure 1A:
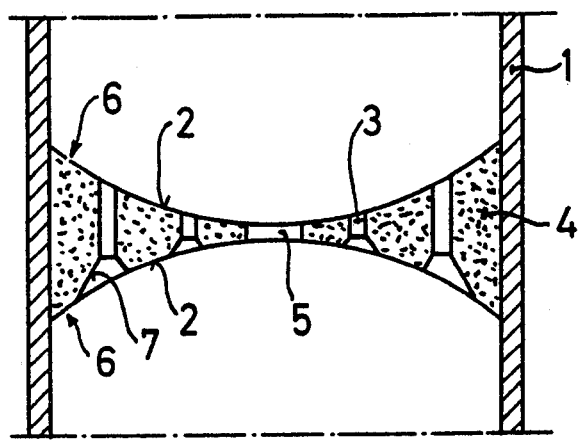

United States Patent [19]

Schulz et al.

[11] 4,436,702

[45] Mar. 13, 1984

[54] REACTOR FOR HYDROGENATING COAL SLURRY

[75] Inventors: Rudi Schulz, Fussgoenheim; Hubert Puestel, Mutterstadt; Georg Weber, Ludwigshafen; Heribert Kuerten, Neustadt, all of Fed. Rep. of Germany

[73] Assignee: BASF Aktiengesellschaft, Fed. Rep. of Germany

[21] Appl. No.: 338,244

[22] Filed: Jan. 11, 1982

[30] Foreign Application Priority Data

Jan. 30, 1981 [DE] Fed. Rep. of Germany ....... 3103081

[51] Int. Cl.³ ................................ B01J 8/04
[52] U.S. Cl. ..................... 422/195; 208/10; 208/142; 261/22; 261/113; 422/239; 422/242
[58] Field of Search ............. 422/193, 195, 239, 242, 422/176; 208/10, 142; 261/22, 77, 114 JP, 114 TC, 122, 113, 94–98, 108, DIG. 72; 48/61, 74, 73

[56] References Cited

U.S. PATENT DOCUMENTS

| 1,257,314 | 2/1918 | Castellano | 422/239 |
|---|---|---|---|
| 1,741,519 | 12/1929 | Huff | 261/77 X |
| 2,924,441 | 2/1960 | Osborne | 261/114 JP X |
| 3,477,828 | 11/1969 | Schulze et al. | 422/195 X |
| 3,586,485 | 6/1971 | Hagemeyer, Jr. et al. | 261/94 X |
| 3,796,657 | 3/1974 | Pretorius et al. | 261/94 X |
| 3,823,084 | 7/1974 | Schroeder | 208/10 |
| 3,853,929 | 12/1974 | Cornelius et al. | 422/193 X |
| 4,012,311 | 3/1977 | Greene | 208/142 X |
| 4,328,177 | 5/1982 | Trager | 261/114 JP |

OTHER PUBLICATIONS

Chemie Ing. Techn., MS 417/76.

Primary Examiner—Richard L. Chiesa
Attorney, Agent, or Firm—Keil & Witherspoon

[57] ABSTRACT

A multi-stage reactor for hydrogenating coal slurry in a pressure vessel for pressures of up to 700 bar, preferably of up to 350 bar, with inlets for gas and coal slurry through the reactor bottom, an outlet for sludge, gases and vapors in the reactor top, and dividing trays in the pressure vessel, by means of which trays the individual reaction stages are separated from one another, wherein each dividing tray has a progressively reducing cross-section, with passage orifices, over its entire lowr face, so as to prevent coal slurry caking onto the tray in the direction of flow of the reactants (gas and coal slurry).

5 Claims, 10 Drawing Figures

REACTOR FOR HYDROGENATING COAL SLURRY

The present invention relates to a multi-stage reactor for hydrogenating coal slurry in a pressure vessel for pressures of up to 700 bar, preferably of up to 350 bar, with inlets for gas and coal slurry through the reactor bottom, an outlet for sludge, gases and vapors in the reactor top, and dividing trays in the pressure vessel, by means of which trays the individual reaction stages are separated from one another.

It is known that the hydrogenation of coal can be carried out in four reactors arranged in series. These reactors are all of identical size and have an inner diameter (without refractory lining) of 1 m and a height of 18 m. Conical portions having a total cone angle of 30° are provided at the top and bottom, thereby reducing the reactor cross-section to the cross-section of the feed lines or connecting lines. 40–50% of the hydrogen is converted in the first reactor, 30% in the 2nd, 20% in the 3rd and less than 10% in the 4th. These ratios correspond to the distribution of heat generation in the 4 reactors. This stepwise arrangement shows that a tube reactor would be the most advantageous from the point of view of the reaction kinetics. However, this means that an approximation to the ideal behavior of a tube reactor would be achieved by arranging in series as many reactors as possible, each with stirred kettle characteristics. On the other hand, dividing the reaction over more than 4 reactors arranged in series has hitherto not been possible, since, the 4th reactor, heat radiation losses already slightly exceeded heat generation. This is because hydrogenation reactors which are internally heat-insulated by a refractory lining must not be insulated on the outside.

Economic considerations dictate that nowadays reactors should be made with larger diameters and accordingly larger volumes. While diameters of 1 m represent the limit achievable with conventional high pressure reactors, it is nowadays possible to fabricate reactors with 4–5 m internal diameter. On the other hand, there seems little sense in building such reactors with the narrow cone angle of the conventional reactors, since, for the volume involved, such reactors would virtually consist of nothing more than 2 conical portions. Furthermore, the expense of the material of construction and of fabrication would be too great. Large high pressure reactors nowadays preferably terminate in a hemispherical portion at both top and bottom. With this shape of reactor, the problem arises of how the gas and liquid can be distributed uniformly over the cross-section within a short path.

Dividing trays in reactors for handling a three-phase system of liquid, disperse solid and gas have been described by Blaß and Cornelius (Chemie Ing.Techn. MS 417/76). They employed sieve trays, ie. flat plates with numerous small circular holes, the diameter of which varied from 2 to 4 mm. The free cross-section of the holes, as a percentage of the apparatus cross-section, was from 1.1 to 36%. The holes were sharp-edged and their diameter was accurate to ±50 μm. A typical method of operation of these trays is to create a large cushion of gas under the tray. As the gas throughput rate increases, the size of cushion increases. Only as a result of a sloshing motion of the frothing layer of liquid can the liquid pass through the holes into the next higher reactor cell, thereby effecting axial transport of liquid. This sloshing motion causes pressure fluctuations, both with time and from place to place, these being intensified by the equally increased non-steady state turbulent flow in the frothing layer.

However, such dividing trays cannot be employed in coal hydrogenation, since the coal slurry which sloshes against their undersides remains hanging in droplets thereon, dries out, becomes coked and then also clogs the small holes.

It is an object of the present invention to provide a reactor of from 3 to 5 m internal diameter, in which, through arranging in series not less than 4, and preferably more than 4, reaction stages, each with stirred kettle characteristics, an approximation to the desired tube reactor characteristics is achieved, and wherein uniform distribution of gas and liquid over the cross-section, at the transition from one stage to the next, is achieved, over a very short vertical distance, without the occurrence of back-mixing with the contents of the preceding reaction stage.

We have found that this object is achieved, according to the invention, by providing the following features:

(a) Each dividing tray built into a pressure vessel has a progressively reducing cross-section, with passage orifices, over its entire lower face, so as to prevent coal slurry caking onto the tray in the direction of flow of the reactants.

(b) The dividing trays can be of concave cross-section.

(c) The upper face of the dividing trays exhibits a progressive increase in cross-section of the passage orifices, in the direction of flow.

(d) The cross-sectional area of the passage orifices is from 1 to 15%, preferably from 1 to 5%, of the cross-sectional area of the reactor.

(e) The dividing trays rest on rings or studs welded onto the inside of the reactor jacket, the said jacket being heat-insulated by a refractory lining, except where the pump is welded in.

With the dividing trays according to the invention, a gas cushion cannot form under the tray. All parts of the tray are flushed so that the coal slurry cannot dry out and become coked. The passage orifices are substantially larger than in the Blaß and Cornelius sieve trays, described above. The cross-section of the orifices corresponds to individual diameters of from 10 to 90 mm, preferably from 20 to 50 mm. The gas velocity is from 3 to 8 m/s, so that there cannot be any backflow of liquid.

FIGS. 1A, 1B, 2A, 2B, 3A, 3B, 4A, 4B, and 4C show sections and plan views, and

Figure 5:
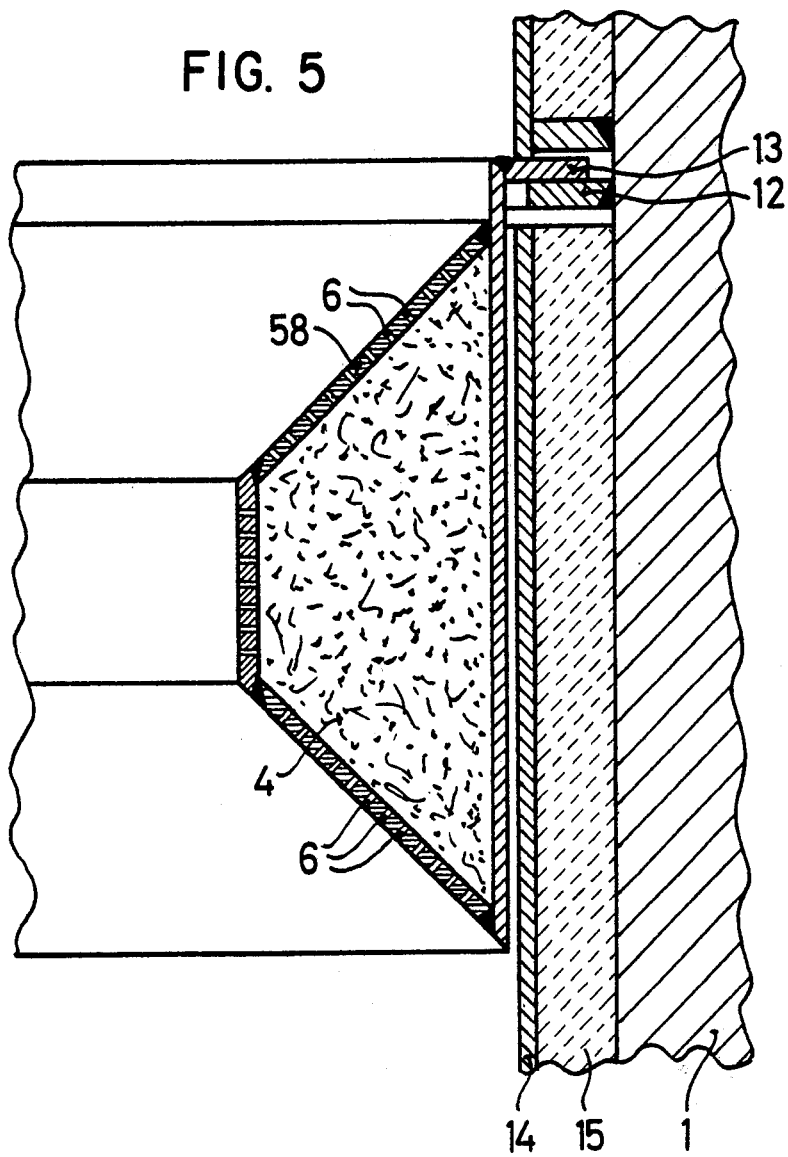

FIG. 5 shows a side view, of some typical embodiments of the invention.

Figure 1B:
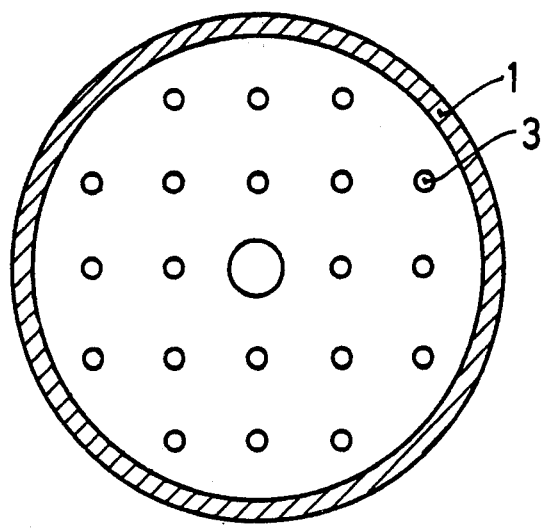

In FIGS. 1A and 1B, two domed shells 2 are assembled opposite and together form the dividing tray. Their shape can be conical, elliptical or spherical. The shells 2 are joined to one another by tubular passage orifices 3, and on the face of the lower shell 2 the orifices 3 have conical inlets 7. Through these orifices 3, gas and coal slurry rise from one element of the reactor 1 to the next higher element. The cavity between the shells 2 is filled by injection with a ceramic mass 4; asbestos cement, for example, has proved suitable. A reinforcement can additionally be introduced into the space. To balance the pressure, the shells 2 have a large number of small holes 6. A manhole 5 can be provided in the tray, to allow an operator to climb through.

Figure 2A:
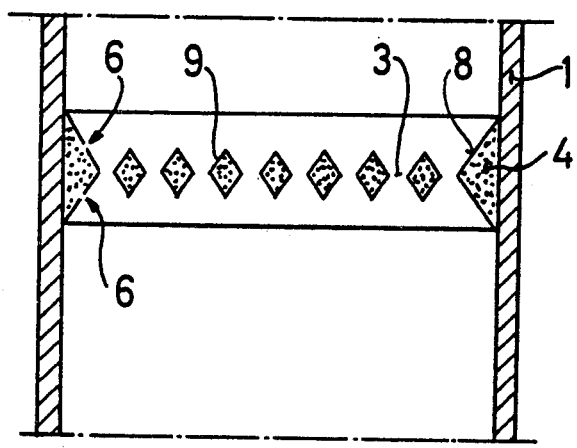
Figure 2B:
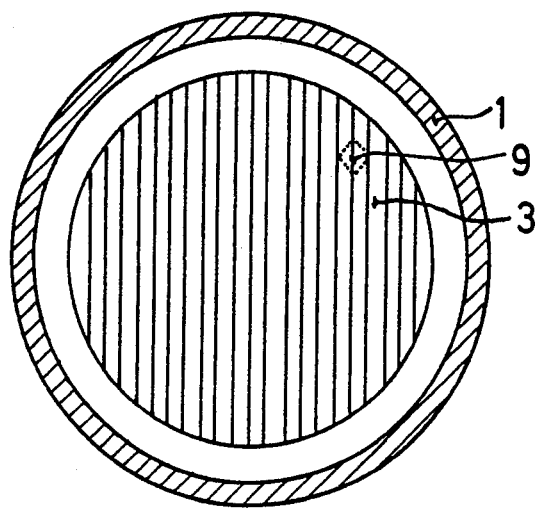

FIGS. 2A and 2B show a simple construction which, however, is only suitable where the ratio of total orifice cross-section to total reactor cross-section is relatively high. A peripheral ring 8 of triangular cross-section is attached to the reactor jacket 1. Lozenge-shaped rods 9 are laid in this ring, the slots between them constituting the passage orifices 3. The cavities of the ring 8 and the rods 9 can be filled with a ceramic mass 4, the surfaces being provided with numerous small holes 6 for pressure equalization.

Figure 3A:
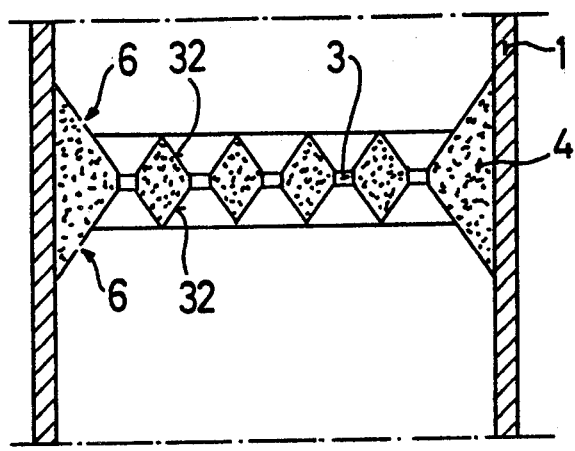
Figure 3B:
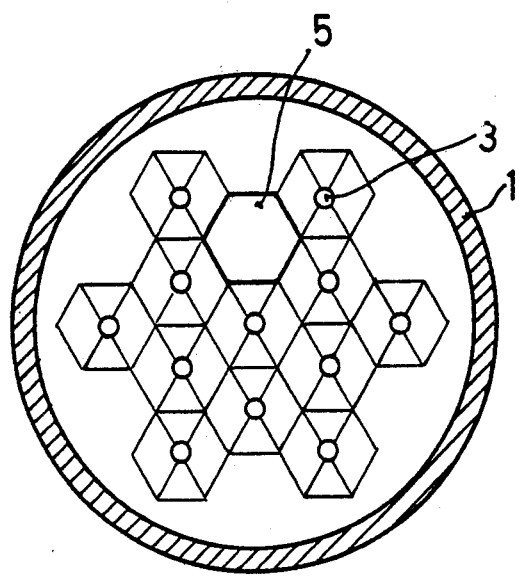

FIGS. 3A and 3B illustrate a further embodiment which is composed of hexagonal elements. Each liquid element arriving at the dividing tray from below impinges on an inclined face 32 and is hence led to a passage orifice 3. At no point is there any extended surface on which slurry can stick and dry out. One of these hexagonal elements is constructed as a manhole 5. The cavities are again filled with a ceramic mass 4 and the shell elements are again provided with holes 6 for pressure equalization.

Figure 4A:
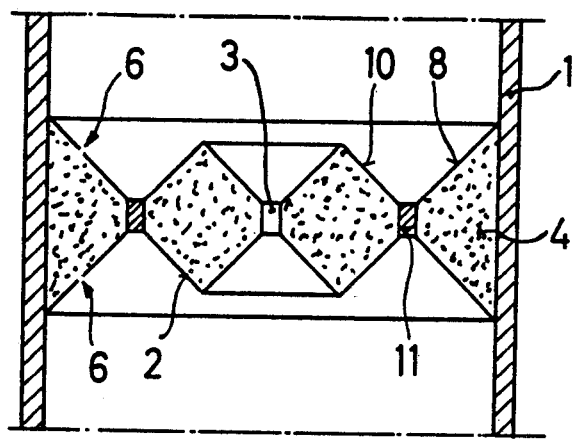
Figure 4B:
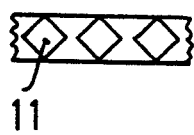
Figure 4C:
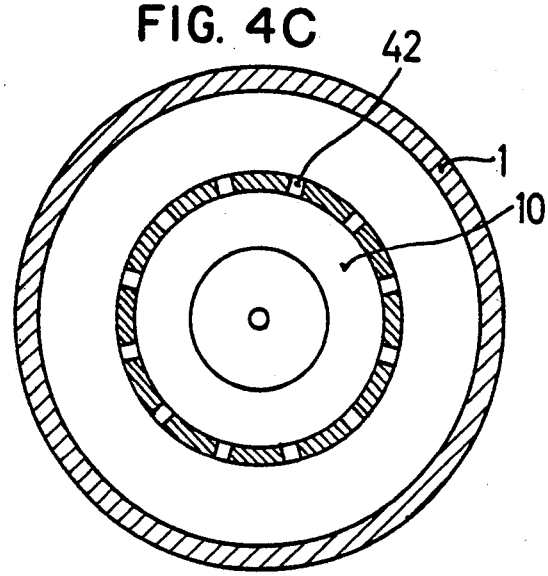

FIGS. 4A, 4B, and 4C show a further interesting embodiment. Again, a ring 8 of triangular cross-section is attached to the reactor jacket 1. In the center of the tray is a further lozenge-shaped ring 10 with a central passage orifice 3. The two rings 8 and 10 are connected by lozenge-shaped elements 11, forming orifices 42.

For strength reasons, the hydrogenation reactors are internally heat-insulated by a refractory lining 15, as shown in FIG. 5. A skirt 14 of stainless steel is fitted in front of this lining. The internal fitments must be so constructed that they can freely move with any heat expansion. Consequently, the dividing trays rest, by a ring 13, on rings or studs 12 welded onto the reactor wall. The peripheral outer ring 58 of the dividing tray corresponds to the ring 8 in FIG. 4A. This ring 58 can expand freely.

We claim:

1. A multi-stage reactor for hydrogenating coal slurry under pressures of up to 700 bar, preferably of up to 350 bar, comprising a closed pressure vessel having inlets for gas and coal slurry through the reactor bottom, an outlet for sludge, gases and vapors in the reactor top, and at least 4 dividing trays in the pressure vessel, by means of which trays the individual reaction stages are separated from one another, wherein each dividing tray has a progressively reducing cross-section comprising two opposed shells of conical, elliptical or hemispherical shape, with passage orifices, spaced over its entire lower face, so as to prevent coal slurry caking onto the tray in the direction of flow of the gas and coal slurry reactants, said passage of orifices having inlets on the face of the lower shell which are reduced in cross-section with upward distance, the space between said shells being filled with a ceramic mass, and said shells having a multiplicity of small holes therein.

2. The reactor of claim 1, wherein the dividing trays are of concave cross-section.

3. The reactor of claim 1 or 2, wherein the passage orifices widen progressively toward the upper face of the dividing tray.

4. The reactor of claim 1, wherein the cross-sectional area of the passage orifices is from 1 to 15%, preferably from 1 to 5%, of the cross-sectional area of the reactor.

5. A reactor as claimed in claim 1, wherein the dividing trays (2) rest on rings (12) or studs welded onto the reactor jacket.

* * * * *